Dec. 29, 1953     H. KLEINMAN     2,664,294
RINK ROLLER SKATE WITH QUICKLY EXCHANGEABLE TRUCKS
Filed May 22, 1950
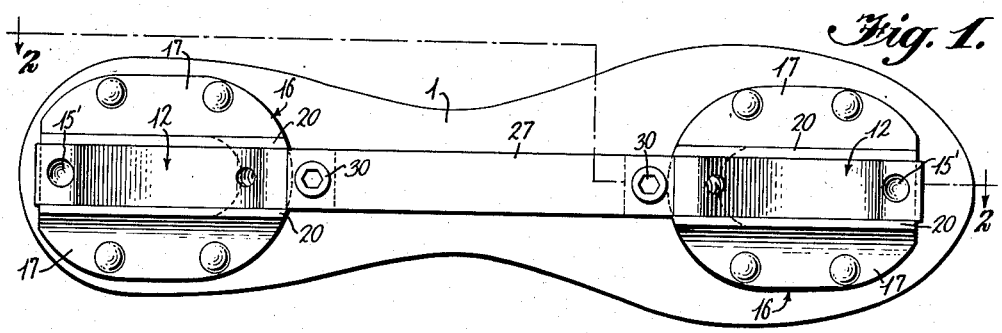
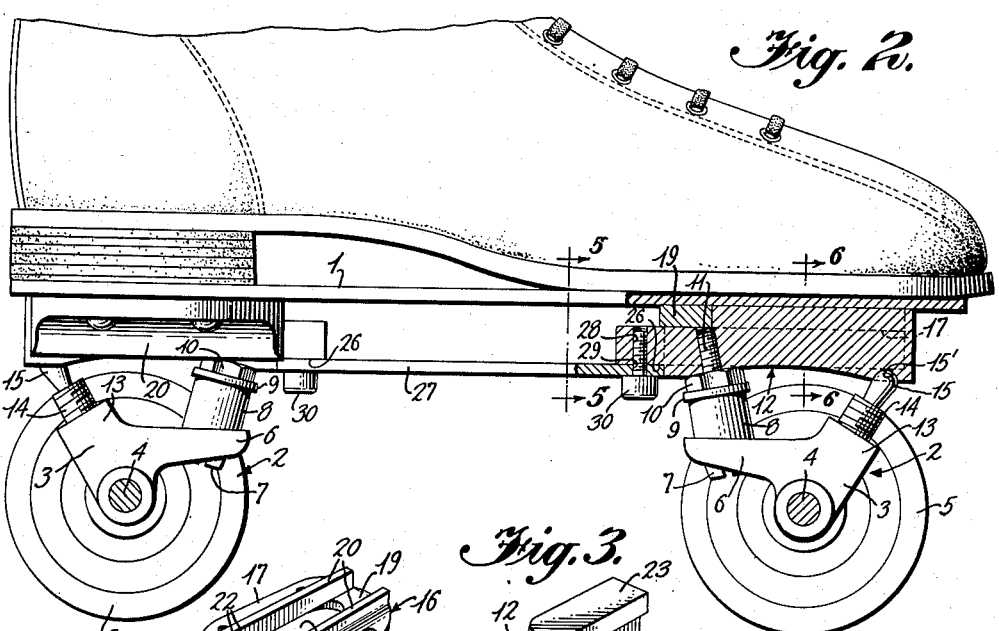
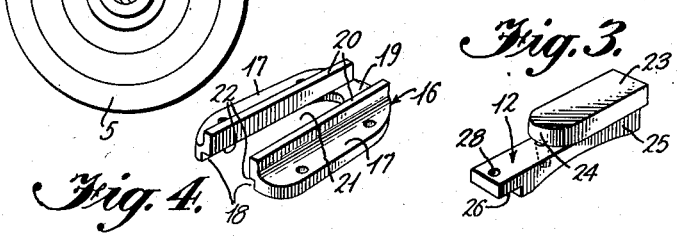
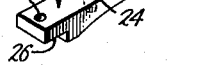
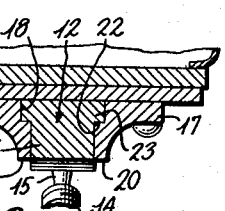
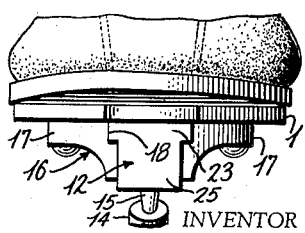
INVENTOR
Harry Kleinman
BY Mason, Fenwick and Lawrence
ATTORNEYS

Patented Dec. 29, 1953

2,664,294

UNITED STATES PATENT OFFICE 2,664,294

RINK ROLLER SKATE WITH QUICKLY EXCHANGEABLE TRUCKS

Harry Kleinman, Staten Island, N. Y.

Application May 22, 1950, Serial No. 163,475

3 Claims. (Cl. 280—11.27)

This invention relates to rink roller skates which, as is well known, are unitary with the shoes, each including a foot plate permanently attached to the shoe, and forward and rearward rubber cushioned identical trucks secured to the foot plate by kingbolts which pass through the cushions and screw into the foot plate.

Frequently, something happens to the truck, such as for example, a split wheel, a bent axle, a broken rubber cushion, etc. The skater must remove the shoe with the skate, and hand it to the service mechanic, who must remove the truck by unscrewing the kingbolt from the foot plate. This causes the truck to become more or less disassembled, since a number of elements, washer, nut, etc., are more or less loosely on the kingbolt. If the mechanic cannot at once take care of the job, the skater must leave the shoe with the broken truck, and also cannot use the other skate, but must either quit skating or secure another pair of shoes with skates attached.

The object of the present invention is to provide a rink skate in which a slide and guide coupling for each truck intervenes between the truck and foot plate, one part being carried by the truck and the other by the foot plate. This makes it possible instantly to replace a faulty truck with a perfect truck at the service counter where a supply of perfect trucks is maintained, by merely unfastening and sliding out the defective truck and sliding in the replacement truck without the necessity of the skater taking off the shoe. The skater is subjected to practically no interruption to his sport or performance, being entirely unconcerned with the amount of time required for reconditioning the defective truck.

Another object of the invention is the provision of the rink skate having the trucks and foot plate equipped with the aforementioned complementary slide and guide members, the trucks being positioned and secured, by sliding them toward one another until they engage respective stops determining their innermost relative positions, there being a tie bar secured to said truck units for maintaining them in innermost position, said tie bar by virtue of its being spaced from and parallel to said foot plate and rigidly mounted with respect thereto, constituting with the foot plate a girder reinforcement of the skate between the trucks.

Other objects of the invention will appear as the following description of a preferred and practical embodiment thereof proceeds.

In the drawing which accompanies and forms a part of the following specification, and throughout the several figures of which the same reference characters have been used to denote identical parts:

Figure 1 is a bottom plan view of a skate constructed according to the principles of the invention, the slides and guides being shown in interdigitating relation, but the trucks being omitted;

Figure 2 is a side elevation partly in section, with the trucks attached;

Figure 3 is a perspective view of a slide;

Figure 4 is a perspective view of a guide;

Figure 5 is a section taken along the line 5—5 of Figure 2;

Figure 6 is a section taken along the line 6—6 of Figure 2;

Figure 7 is a front elevation.

Referring now in detail to the several figures, the numeral 1 represents the foot plate which is flat and riveted to the shoe. The trucks, which as a unit are designated by the numeral 2, are identical and, per se, conventional. Each comprises a body 3, having an axial bore containing a fixed axle 4, having the rollers 5 journaled on its outwardly extending end portions.

The body has an inner extension 6, provided with a bolt hole through which the kingbolt 7 passes. On the kingbolt is a rubber cushion 8, washer 9, and nut 10. The bolt hole in the extension is a free fit about the kingbolt, so that the truck is tiltable laterally with respect to the kingbolt. The resistance to tilt is adjustably controlled through the amount of the compression put upon the cushion 8 by the nut 10. The kingbolt has a threaded end portion 11, extending beyond the nut 10, which anchors the kingbolt fixedly in the slide 12.

The body 3 of the truck has a boss 13 extending inclinedly upward and outwardly, threaded inside and adjustably receiving the plug 14, which has a ball end 15 fitting into a socket 15' of spherical curvature formed in the slide 12.

The extent to which the kingbolt is screwed into the slide, and the degree of axial adjustment of the plug 14 are such as to cause the bolt end to be retained in the socket, regardless of the degree of compression of the cushion 8. The kingbolt is always screwed into the slide until the nut 10 abuts the slide, the nut acting as a lock nut to hold the kingbolt tight. The truck with attached slide is referred to in the claims as a truck unit, to distinguish from the conventional truck which does not have the slide. The slide and guide are complementary members. The guide 16 is fundamentally a U-shaped member having sides in the form of flat flanges 17, defining between them a wide groove 18 with parallel sides, the inner end of which is closed by the transverse limb or bight 19 of the U-shaped member. The latter also has spaced parallel flanges 20, perpendicular to the plane of the foot plate 1, forming a channel 21 narrower than the groove 18, and symmetrical with respect to the medial longitudinal plane of the groove 18, so that the flanges 20 overhang the groove 18, forming retaining shoulders 22. The channel 21 is open at both ends. One of the guides, as thus described, is secured at each end of the foot plate, the open ends of the grooves 18 facing the ends of the foot member.

The slide 12 is formed with a keeper 23, slidably fitting the groove 18, retained by the shoulder 22. It has a rounded inner end 24 of complementary contour to that of the bight 19, the latter acting as a stop to limit the inner travel of said keeper.

The slide is formed with a block 25, integral with the keeper 23, but narrower than the keeper, so as to slidably fit the relatively narrow channel 21. The block 25 extends beyond the rounded end of the keeper 23 so as to project inwardly beyond the guide. It has a rabbet 26 on its under side shaped to receive one end of the tie bar 27. There is a hole 28 through the horizontal wall of the rabbet and corresponding hole 29 in the end of the tie bar to receive the bolt 30 for securing the tie bar to the block.

The tie bar is of such length as to hold both truck units in position with their keeper 23 firmly against the respective bights 19 when the tie bar is secured to the truck units. The tie bar being rigid with respect to the truck units and foot plate, spaced from the latter and parallel thereto, forms with the foot plate a girder of relatively great depth, stiffening the skate between its points of support represented by the rollers.

The advantages of this invention from the standpoint of the skater have been touched upon in the earlier part of this specification. From the standpoint of the rink owner or operator it makes possible an immense savings in the investment required for maintaining a sufficient supply of reserve skates on hand to replace the normal casualties of disabled skates. At the present time the rink operator must carry on hand a large number of complete pairs of skates of the different size ranges, involving an investment of many thousands of dollars. By the use of the present invention it is necessary to stock for replacement purposes only a limited number of single truck units.

While I have in the above description disclosed what I believe to be a preferred and practical embodiment of the invention, it will be understood by those skilled in the art that the specific details of construction and arrangement of parts, as shown and described, are by way of example and not to be construed as limiting the scope of the invention.

What I claim as my invention is:

1. Skate including a foot plate, truck units therefor at front and rear, each unit comprising truck having a kingbolt, and the male member of a slide and guide coupling secured thereto by said kingbolt, the complementary female members of said coupling being secured to the front and rear of said foot plate, each having a longitudinal groove open at one end and closed at the other, and having spaced overhanging flanges at the sides forming retaining shoulders, said spaced flanges defining a relatively narrow open ended channel communicating with said groove throughout the length of the latter and extending beyond the closed end of said groove, said female members being orientated so that the open ends of said grooves face oppositely outward, said male members each comprising a block slidably fitting said channel and a slide integral therewith fitting said groove, said blocks each having a rabbeted inner end extending inwardly of the skate, and a tie bar having its ends in the rabbeted ends of said blocks and bolted thereto, of such length as to hold said truck units against the closed ends of the grooves of the respective female members.

2. Skate, including a foot plate, trucks therefor at front and rear, detachable coupling means between said trucks and foot plate, said coupling means comprising a slide carried by each truck and guides for said slides fixed to said foot plate, one at the front, the other at the rear, said guides each comprising a base member having a longitudinal slot therein with parallel sides, closed at one end and open at the other, said guides being arranged with the open ends of said slots facing respectively to front and rear of said foot plate, the closed ends being directed inwardly, said slides each having a keeper shaped to fit the slot in the corresponding guide and slidable therein, and having a portion integral with said keeper extending inwardly beyond the closed end of said slot when said keeper is seated against the closed end and a tie bar detachably secured to said extending portions maintaining said keepers tight against said closed ends.

3. Skate, including a foot plate, trucks therefor at front and rear, detachable coupling means between said trucks and foot plate, said coupling means comprising a slide carried by each truck and guides for said slides fixed to said foot plate, one at the front, the other at the rear, said guides each comprising a base member having a longitudinal slot adjacent said foot plate, said slot having parallel sides and being closed at one end and open at the other, said slides each being formed with a keeper shaped to fit in the corresponding slots and slidable therein, said base member being formed with downwardly extending flanges parallel to the sides of said slot and offset inwardly with respect to said sides forming therewith retaining channels for said keeper, said base plates being arranged with the closed ends of said slots facing inwardly with respect to the ends of said foot plate, said slides having a portion integral with said keeper slidably fitting between said flanges and extending beyond the closed ends of said slots when said keepers are seated against said closed ends, and a tie bar detachably secured to said extending portions maintaining said keepers tight against said closed ends.

HARRY KLEINMAN.

References Cited in the file of this patent

UNITED STATES PATENTS

| Number | Name | Date |
|--------|------|------|
| 214,563 | Harwood | Apr. 22, 1879 |
| 265,371 | Barney | Oct. 3, 1882 |
| 299,682 | Ryerson | June 3, 1884 |
| 306,029 | Moore | Sept. 30, 1884 |
| 352,743 | Fenton | Nov. 16, 1886 |